Aug. 11, 1959   O. J. BOLLAND   2,898,696
AUTOMATIC FISHING DEVICES
Filed May 5, 1958
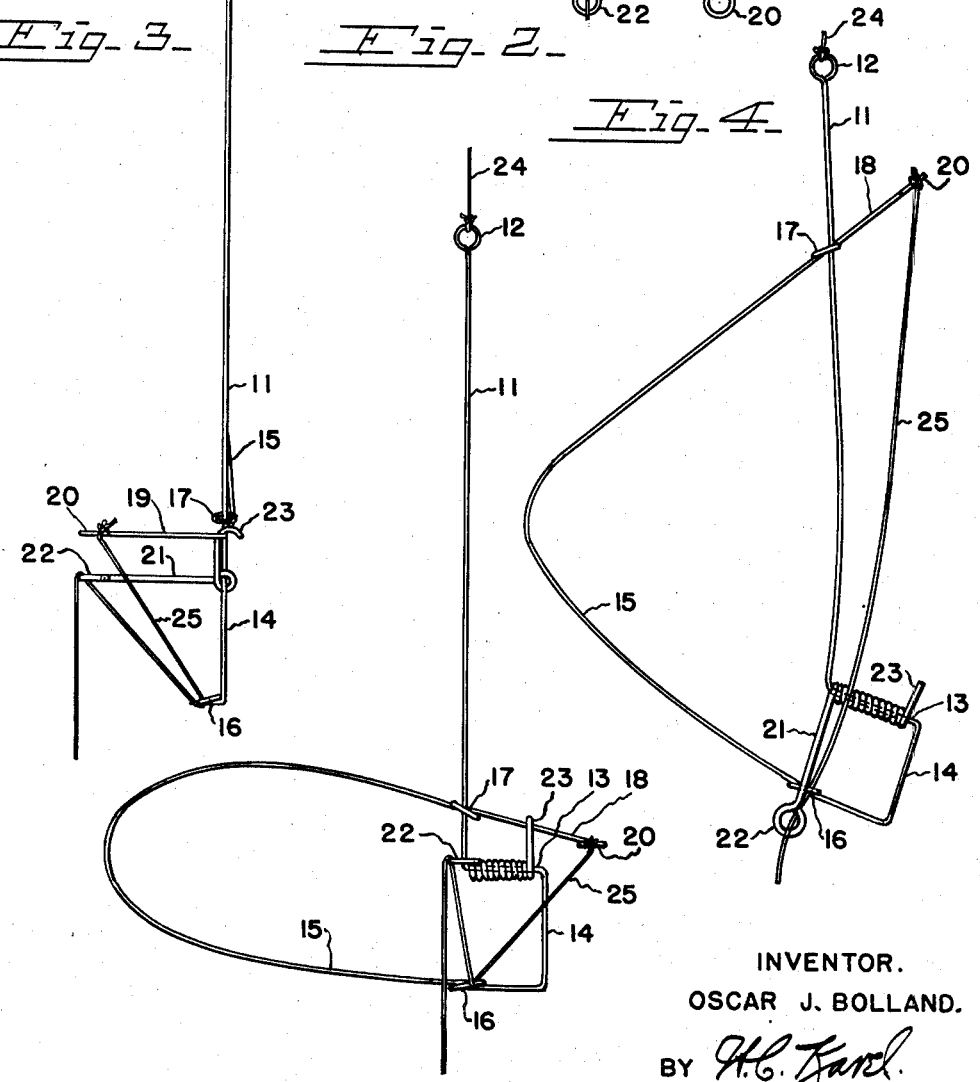
INVENTOR.
OSCAR J. BOLLAND.
BY
ATTORNEY.

United States Patent Office 2,898,696
Patented Aug. 11, 1959

2,898,696

AUTOMATIC FISHING DEVICES

Oscar J. Bolland, Norwood, Ohio

Application May 5, 1958, Serial No. 732,939

1 Claim. (Cl. 43—15)

This invention relates to an automatic fishing device arranged to be inserted in the fishing line between the attachment of the line to the pole and the hook. This device is intended for pole or line fishing and in practice the device is placed a short distance from the hook and may be used with or without a float on the line. In using the device, when a fish takes the bait and attempts to run with it, the pull on the line trips the trigger and the spring member moves rapidly upward causing a jerk on the line to set the hook in the fish.

The object of my invention is to provide an automatic device on a fishing line to cause a sudden jerking of the line to set the hook in a fish.

Other objects will be apparent as the description progresses.

My invention will be further readily understood from the following description and claim, and from the drawings, in which latter:

Fig. 1 is a plan view of my improved device.
Fig. 2 is a front view of the same, in cocked position.
Fig. 3 is an end view of the same.
Fig. 4 is a view similar to Fig. 2, with the device in released position.

My improved fishing device comprises a spring wire having a straight portion 11 terminating in an eye 12 at its upper end. The wire is bent at right angles to form a portion 13, a downwardly extending portion 14, and bent to form a large loop 15 having an eye 16 formed in the loop directly below the extending portion 11 and an eye 17 looped around the extending portion 11. The wire extends outwardly forming the portion 18 and a portion 19 bent at right angles terminating in an eye 20. A trigger is formed by an extending portion 21 having an eye 22 at one end and this wire is pivoted on the portion 13 by being wound around said portion and terminating in a hook 23.

This device is intended for use with pole fishing wherein the line 24 extends from the pole to the eye 12. A suitable float may be attached to the line 24. A second line 25 is attached to the eye 20 and extends through the eye 16, the eye 22 and downward having a fish hook attached to the end of the line 25. When a fish takes the bait and attempts to run with it, the line 25 is pulled, tripping the hook 23 which releases the member 15 causing a sudden jerk on the line 25 for setting the fish hook in the fish.

Having thus fully described my invention, what I claim as new and desire to secure by Letters Patent, is:

An automatic fishing device comprising a spring wire member formed with a straight portion, a U shaped offset having a first eye below said straight portion, an enlarged resilient loop extending outwardly from said first eye and turning back and a second eye encircling said straight portion and then extending past the straight portion and terminating in a third eye at the free end of said enlarged loop, a separate trigger member encircling the upper portion of said U shaped offset having a hook at one end and an extending portion terminating in a fourth eye, said hook arranged to engage with the free end of said loop when biased downward in tension, a line attached to the upper end of said straight portion, and a second line attached to said third eye on the end of said enlarged loop and said second line threaded through said first eye below said straight portion and through said fourth eye on said trigger member whereby a pull on said second line will release said trigger hook from engagement with the free end of said enlarged loop permitting said enlarged loop to spring open and jerk said second line.

References Cited in the file of this patent

UNITED STATES PATENTS

| 677,655 | Gary | July 2, 1901 |
| 1,317,843 | Wehner et al. | Oct. 7, 1919 |
| 2,526,980 | Turchan | Oct. 24, 1950 |
| 2,824,403 | Booth | Feb. 25, 1958 |

FOREIGN PATENTS

| 86,160 | Austria | Nov. 10, 1921 |